(12) United States Patent
Kim

(10) Patent No.: US 10,166,958 B2
(45) Date of Patent: Jan. 1, 2019

(54) SYSTEM FOR CONTROLLING AUTO VEHICLE HOLD FOR VEHICLE

(71) Applicant: Hyundai Motor Company, Seoul (KR)

(72) Inventor: Tae Heon Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/486,889

(22) Filed: Apr. 13, 2017

(65) Prior Publication Data

US 2018/0154876 A1 Jun. 7, 2018

(30) Foreign Application Priority Data

Dec. 7, 2016 (KR) .......................... 10-2016-0165470

(51) Int. Cl.
*B60T 8/40* (2006.01)
*B60T 7/12* (2006.01)
*B60T 13/68* (2006.01)
*B60T 8/34* (2006.01)
*B60T 13/14* (2006.01)

(52) U.S. Cl.
CPC ................ *B60T 8/341* (2013.01); *B60T 7/12* (2013.01); *B60T 8/344* (2013.01); *B60T 8/4081* (2013.01); *B60T 13/141* (2013.01); *B60T 13/686* (2013.01)

(58) Field of Classification Search
CPC .......... B60T 8/40; B60T 8/4013; B60T 8/404; B60T 8/4072; B60T 8/4081; B60T 8/4086; B60T 7/12; B60T 7/122; B60T 13/141; B60T 13/686

USPC ......................................... 303/116.2, 89, 191
See application file for complete search history.

(56) References Cited

U.S. PATENT DOCUMENTS

| | | | | |
|---|---|---|---|---|
| 5,979,997 A * | 11/1999 | Ohkubo | ............... | B60T 8/3255 303/116.1 |
| 5,992,949 A * | 11/1999 | Nakamura | .............. | B60T 8/326 303/116.1 |
| 6,086,515 A * | 7/2000 | Buschmann | ............ | B60T 7/122 303/191 |
| 6,332,654 B1 * | 12/2001 | Yano | ........................ | B60T 7/122 188/353 |
| 6,336,689 B1 * | 1/2002 | Eguchi | .................... | B60T 7/122 188/DIG. 2 |
| 6,370,466 B1 * | 4/2002 | Hada | ....................... | B60T 7/122 188/110 |
| 6,814,414 B1 * | 11/2004 | Schmitt | ................... | B60T 7/122 188/DIG. 2 |
| 7,926,887 B2 * | 4/2011 | Ohkubo | ................ | B60T 8/4081 303/122.03 |
| 8,655,567 B2 * | 2/2014 | Watanabe | ................. | B60T 8/36 303/155 |

(Continued)

*Primary Examiner* — Thomas J Williams
(74) *Attorney, Agent, or Firm* — Morgan, Lewis & Bockius LLP

(57) ABSTRACT

A system may be configured for controlling an auto vehicle hold (AVH) for a vehicle, which is configured for implementing an AVH function by improving a brake hydraulic circuit, wherein an electronic system for controlling an AVH for a vehicle, in which a pair of AVH valves for implementing an AVH function is additionally formed in a hydraulic brake circuit of an active hydraulic brake (AHB), so that the implementation of the AVH function may be continuously maintained even in a state where an electronic parking brake (EPB) is not mounted.

13 Claims, 6 Drawing Sheets

(56) References Cited

U.S. PATENT DOCUMENTS

| | | | |
|---|---|---|---|
| 8,894,159 B2* | 11/2014 | Nakata | B60T 1/10 303/122 |
| 8,931,856 B2* | 1/2015 | Okano | B60T 1/10 303/15 |
| 2005/0001481 A1* | 1/2005 | Kley | B60T 7/122 303/191 |
| 2015/0166028 A1* | 6/2015 | Kim | B60T 13/145 303/10 |
| 2017/0050629 A1* | 2/2017 | Kim | B60T 8/4081 |
| 2017/0297544 A1* | 10/2017 | Jeon | B60T 7/042 |

* cited by examiner

SYSTEM FOR CONTROLLING AUTO VEHICLE HOLD FOR VEHICLE

CROSS-REFERENCE TO RELATED APPLICATION

The present application claims priority to Korean Patent Application No. Korean Patent Application No. 10-2016-0165470 filed on Dec. 7, 2016, the entire contents of which are incorporated herein for all purposes by this reference.

BACKGROUND OF THE INVENTION

Field of the Invention

The present invention relates to a system for controlling an auto vehicle hold (AVH) for a vehicle. More particularly, it relates to a system for controlling an AVH for a vehicle, which improves a hydraulic brake circuit and implements an AVH function.

Description of Related Art

Regenerative braking, which charges a battery when a driver steps on a brake pedal during travelling of a hybrid vehicle and an electric vehicle, is performed, and in order to implement a regenerative braking function, an active hydraulic brake (AHB) that is an active electronic control brake is mounted in the hybrid vehicle, the electric vehicle, and the like.

The AHB refers to a combined braking device, in which functions of an anti-brake system (ABS), a traction control system (TCS), an electronic stability control (ESC), and the like are combined.

The AHB includes a function of an auto vehicle hold (AVH) function.

A driver needs to continuously step on a brake pedal in a situation, such as a long-term stop state or a state of waiting for a signal during the travelling of a vehicle, so that the AVH aims to solve driver's inconvenience, which may increase fatigue of a driver, and the AVH refers to one of convenient devices for a driver, which is capable of maintaining a stop state even though the driver takes his/her foot off the brake pedal after the driver steps on the brake pedal in a D/R/N stage and the vehicle stops.

In order to implement the AVH function, a current is applied to a cut valve among the kinds of valve configuring a hydraulic brake circuit of the AHB, so that a closing operation is performed, and the current may be continuously applied for about 10 minutes.

However, when the current is applied to the cut valve for 10 minutes or longer, that is, the current is applied to a coil around an armature configuring the cut valve for 10 minutes or longer, heat is generated by resistance, and thus, the deterioration of a peripheral portion of the cut valve is progressed and durability of the cut valve is sharply degraded.

In this respect, in order to prevent the deterioration of the entire AHB function due to the degradation of the durability of the cut valve, when the current is applied to the cut valve for 10 minutes or longer, the application of the current is automatically blocked, and an AVH switch control, in which the AVH function is performed by an electronic parking brake (EPB), is performed.

Accordingly, in order to implement the AVH function in a vehicle mounted with the AHB, there is a limitation in that the high-priced EPB needs to be essentially mounted together, and as a result, it is impossible to implement the AVH function in a vehicle, in which the EPB is not mounted.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an economical system for controlling an auto vehicle hold (AVH) for a vehicle, in which a pair of AVH valves for implementing an AVH function is additionally formed in a hydraulic brake circuit of an active hydraulic brake (AHB), so that the implementation of the AVH function may be continuously maintained even in a state where an electronic parking brake (EPB) is not mounted.

Various aspects of the present invention are directed to providing system for controlling an auto vehicle hold (AVH) for a vehicle, the system including: valves mounted in a brake hydraulic circuit, the valves including a cut valve, which blocks a hydraulic pressure flowing from a master cylinder to a wheel cylinder during an operation of the AVH, an in-valve and an out-valve, which are connected to an outlet of a high-pressure accumulator adjusting hydraulic pressure within a reservoir at a high pressure, a normal open valve, which is mounted in a brake hydraulic line extended from an outlet of the in-valve and an outlet of the cut-valve to the wheel cylinder, and a normal close valve, which is mounted on a branched line branched from the brake hydraulic line extended from the normal open valve to the wheel cylinder and includes an outlet connected to a hydraulic return line, in which an AVH valve for securing a long-term maintenance of an AVH function is mounted in the brake hydraulic line between the outlet of the in-valve and the outlet of the cut valve, and an inlet of the normal open valve.

In an exemplary embodiment, the AVH may include a first AVH valve for controlling hydraulic pressure of front-left (FL) and rear-right (RL) wheels, and a second AVH valve for controlling hydraulic pressure of front-right (FR) and rear-left (RL) wheels. In an exemplary embodiment, the AVH valve may include a first AVH valve for controlling hydraulic pressure of front-left (FL) and rear-right (RR) wheels, and a second AVH valve for controlling hydraulic pressure of front-right (FR) and rear-left (RL) wheels.

In another exemplary embodiment, the AVH valve may adopt a normal close (NC) valve type, in which a valve is opened only when a current is applied, and a valve is closed at a normal time, at which a current is not applied.

In still another exemplary embodiment, during braking, the cut valve may be controlled to be closed by an application of a current, the amount of opening of the in-valve may be controlled by a control of the current, the out-valve may be maintained in a closed state, and the AVH valve may be operated in an opened state by the application of the current.

In yet another exemplary embodiment, the hydraulic pressure from the high-pressure accumulator may pass through the in-valve and the AVH valve and may be provided to the wheel cylinder via the normal open valve, so that the braking of the vehicle may be performed, and when a vehicle speed is close to 0, the vehicle may enter the AVH mode.

In still yet another exemplary embodiment, after the vehicle enters the AVH mode, the cut valve may be controlled to be continuously closed by the application of the current, the in-valve and the out-valve may be controlled to be closed, and the AVH valve may be continuously maintained in the open state by the application of the current, so that the AVH function, in which braking force in a full released state is maintained, may be exhibited.

In a further exemplary embodiment, when a tip-in operation of stepping on an accelerator pedal in a state where an entrance time is a predetermined time or shorter after the vehicle enters the AVH mode is performed, an AVH braking hydraulic pressure release, in which the hydraulic pressure, which has been provided to the wheel cylinder, is returned to a hydraulic pressure return line via the outlet of the out-valve, may be performed through the operation of controlling the out-valve to be opened, the operation of controlling the cut valve to be opened by the blocking of the current, and the operation of maintaining the control of the AVH valve to be opened, and after the control of the cut valve to be opened, the AVH valve may be operated to be closed by the blocking of the current.

In another further exemplary embodiment, when the entrance time is the predetermined time or longer after the vehicle enters the AVH mode, the state of the AVH valve may be switched to the closed state by blocking the current to the AVH valve, and then, the cut valve may be operated to be opened by the blocking of the current, and according to the switching of the state of the AVH valve to the closed state, the hydraulic pressure provided to the wheel cylinder may be maintained, so that the AVH function, in which braking force is maintained in a full released state, may be continuously exhibited.

In still another further exemplary embodiment, when the tip-in operation of stepping on the accelerator pedal in the state where the entrance time is the predetermined time or longer after the vehicle enters the AVH mode is performed, the normal close valve may be operated to be opened by an application of the current, so that the AVH braking hydraulic pressure release may be performed, and according to the operation of the normal close valve to be opened, the hydraulic pressure, which has been provided to the wheel cylinder, may be returned to the hydraulic pressure return line connected to an outlet of the normal close valve, so that the AVH braking hydraulic pressure release may be performed.

In yet another further exemplary embodiment, the application of the current to the normal close valve may be performed for a time in a millisecond unit.

Through the aforementioned technical solutions, various aspects of the present invention are directed to providing the effects below.

First, only a pair of AVH valves for implementing an AVH function is simply and additionally formed in the brake hydraulic circuit of the AHB, so that it is possible to allow the AVH function to be maintained for a long time even in the state where the EPB is not mounted.

Second, it is possible to block the current to all of the valves including the cut valve and the AVH valve while the AVH function is maintained for a long time, so that it is possible to prevent durability of each valve including the cut valve from deteriorating, thereby improving durability.

The effect of the invention is limited to the aforementioned effects. It shall be understood that the effect of the invention includes all of the effects deducible from the descriptions below.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
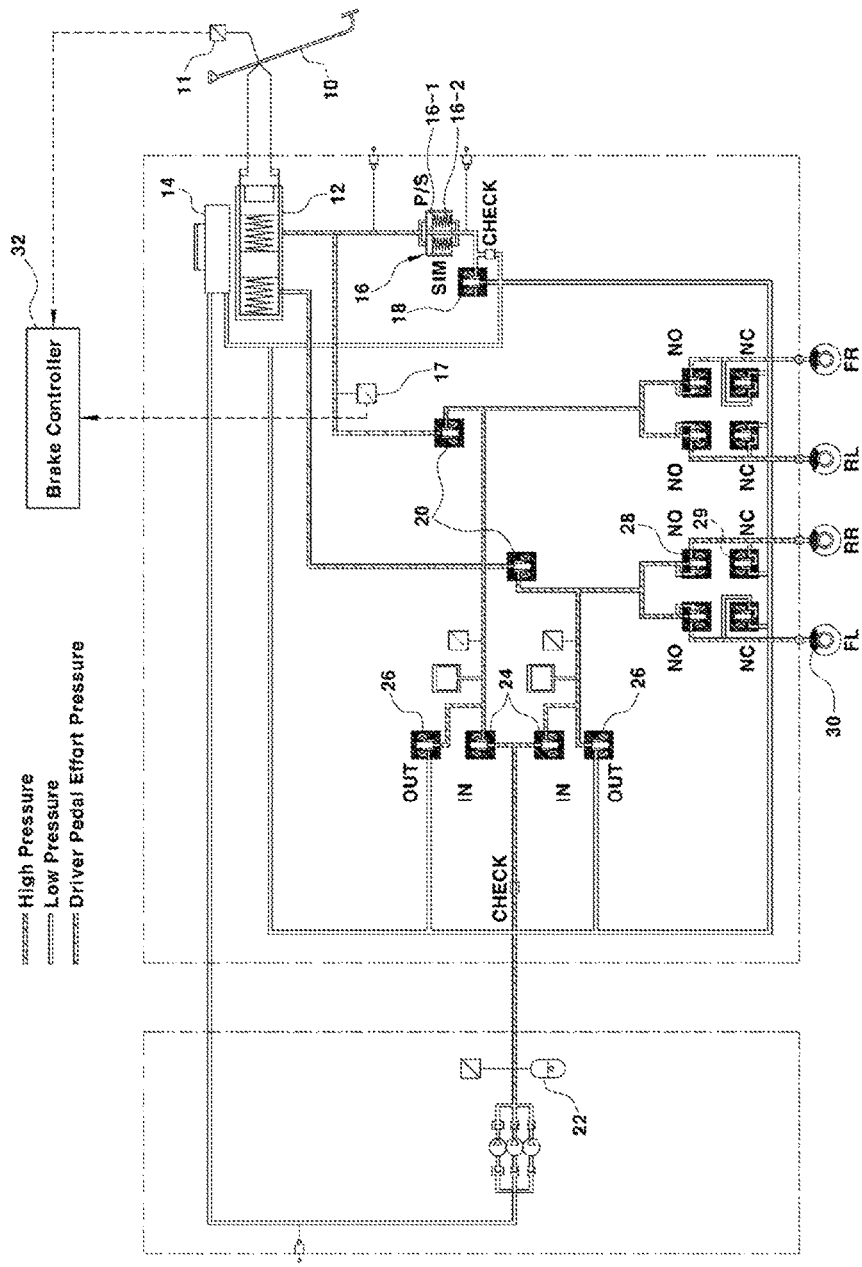
FIG. 1 is a hydraulic brake circuit diagram for implementing an auto vehicle hold (AVH) function.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

First, for helping the understanding of the present invention, a configuration of a hydraulic brake circuit of an active hydraulic brake (AHB) and an operation principle of an auto vehicle hold (AVH) will be described below.

A brake pedal simulator is mounted in an environmentally-friendly vehicle (an electric vehicle, a hybrid vehicle, and the like), in which braking by a hydraulic brake and a cooperative brake control by motor regenerative braking are performed, and further, the brake pedal simulator is also mounted in a general internal combustion engine vehicle to adjust a feeling of step power and repulsive power of a brake pedal with a desired level.

That is, a wheel brake hydraulic controller for exhibiting actual braking force is separated from a pedal simulator device for implementing a feeling of the brake pedal.

FIG. 1 illustrates a circuit of an active hydraulic brake (AHB) of a vehicle mounted with a pedal simulator.

As illustrated in FIG. 1, a master cylinder 12 for delivering brake hydraulic oil within a reservoir 14 is connected to a brake pedal 10.

The pedal simulator device for implementing a filling of the brake pedal includes a pedal simulator 16 connected to a hydraulic discharge line of the master cylinder 12, a simulator valve 18 connected to an outlet side of the pedal simulator 16, a pair of cut valves 20, which is connected to the hydraulic discharge line of the master cylinder 12 and blocks hydraulic pressure transmitted to each wheel when an AVH is operated, and the like.

A pedal stroke sensor 11 is mounted in the brake pedal 10, and a pedal simulator pressure sensor 17 is mounted in the hydraulic discharge line of the master cylinder 12.

In the meantime, the wheel brake hydraulic controller for exhibiting actual braking force includes a high-pressure accumulator 22 for adjusting hydraulic oil within the reservoir 14 at a high pressure, and a pair of in-valves 24 and a pair of out-valves 26 connected to an outlet side of the high-pressure accumulator 22.

In the instant case, a brake hydraulic line extended to the wheel cylinder 30 is connected to an outlet of the in-valve 24 and an outlet of the cut valve 20, so that a normal open valve 28 and a normal close valve 29, which are the sort of wheel valve, only operated under a specific condition including an ABS control for each wheel, are mounted on the brake hydraulic line.

Accordingly, the outlet of the in-valve 24 is connected to the wheel cylinder 30 mounted in each wheel of the vehicle via the normal open valve 28 and the normal close valve 29, which are the sort of wheel valve, operated only under a specific condition including an ABS control for each wheel, and the outlet of the out-valve 26 is connected to a hydraulic pressure return line 15 extended from the reservoir.

The normal close valve 29 is mounted on a branch line, which is branched from the brake hydraulic line connected from the normal open valve 28 to the wheel cylinder 30, and the outlet of the normal close valve 29 is connected to the hydraulic return line 15 extended from the reservoir.

For reference, the normal open valve 28 is always in an open state when a current is not applied, and when a current is applied only under the specific condition, the normal open valve 28 is controlled to be closed, and the normal close valve 29 is always in a close state when a current is not applied, and when a current is applied only under the specific condition, the normal close valve 29 is controlled to be opened.

Here, a process of an operation of the AVH will be described below based on the configuration of the brake circuit of the AHB.

In an initial state, in which the driver does not step on the brake pedal during the travelling, a predetermined high hydraulic pressure (brake pressure) is stored in the high-pressure accumulator 22, and the remaining valves are not operated.

In the meantime, when the driver steps on the brake pedal 10 during the travelling, the pedal stroke sensor 11 mounted in the brake pedal 10 detects a brake pedal stroke (the amount of stepping of the brake pedal stepped by the driver), and when the pedal stroke sensor 11 transmits the detected signal to the brake controller 32, the brake controller 32 determines required braking force of the driver according to the brake pedal stroke.

Subsequently, the cut valve 20 is closed by the application of a current under the control of the brake controller 32, the simulator valve 18 is opened, and the amount of opening of each of the in-valve 24 and the out-valve 26 is adjusted by the control of the current.

Accordingly, the cut-valve 20 is closed, so that the pedal simulator device connected to the master cylinder and the wheel brake hydraulic controller for exhibiting actual braking force are blocked from each other.

In the instant case, the hydraulic pressure from the master cylinder 12 is supplied to the pedal simulator 16 and the simulator valve 18 is opened, so that a piston 16-1 within the pedal simulator 16 compresses a spring 16-2 and moves, and repulsive force of the spring 16-2 is increased and is applied to the brake pedal, so that the driver feels repulse force (pedal operation sense) according to the stepping of the brake pedal.

The hydraulic pressure from the high-pressure accumulator 22 is provided to the wheel cylinder 30 mounted on each wheel of the vehicle via the in-valve 24, so that the braking of the vehicle starts, and when a vehicle speed is close to 0 by the continuous braking in an AVH ready situation, the vehicle enters an AVH mode exhibiting the AVH function.

After the vehicle enters the AVH mode, the in-valve 24 and the out-valve 26 are controlled to be closed, other than the cut valve 20, and the hydraulic pressure provided to the wheel cylinder 30 does not leak, so that the AVH function, in which even though the drivers takes his/her foot off the brake pedal, braking force is maintained, is exhibited.

To implement the AVH function, the current is applied to the cut valve 20 among the valves configuring the brake hydraulic circuit of the AHB and the cut valve 20 is operated to be closed, and when the current is applied to the cut valve 20 for 10 minutes or longer, heat is generated, so that deterioration of a peripheral portion of the cut valve 20 is progressed and durability of the cut valve is sharply degraded.

In this respect, to prevent the deterioration of the entire AHB function due to the degradation of the durability of the cut valve, when the current is applied to the cut valve for 10 minutes or longer, the application of the current is automatically blocked, and an AVH switch control by the brake controller, in which the AVH function is performed by an electronic parking brake (EPB, not illustrated), is performed.

Accordingly, to implement the AVH function in a vehicle mounted with the AHB, there is a limitation in that the high-priced EPB needs to be essentially mounted together, and as a result, it is impossible to implement the AVH function in a vehicle, in which the EPB is not mounted.

In this respect, the present invention places emphasis on the point, in which a pair of AVH valves for implementing an AVH function is additionally formed in the hydraulic brake circuit of the AHB, so that the implementation of the AVH function may be continuously maintained even in a state where the EPB is not mounted.

Hereinafter, an AVH system for a vehicle according to an exemplary embodiment of the present invention, and an operation process thereof will be described.

The present invention is characterized in that an AVH valve 40 is mounted on the brake hydraulic line, which connects the cut valve 20 and the normal open valve 28, and connects the in-valve 24 and the normal open valve 28.

As a matter of course, the AVH valve 40 includes a first AVH valve 41 for controlling hydraulic pressure of front-left (FL) and rear-right (RR) wheels, and a second AVH valve 44 for controlling hydraulic pressure of front-right (FR) and rear-left (RL) wheels.

The AVH valve 40 adopts a normal close (NC) valve type, in which a valve is operated to be opened only when a current is applied, and is operated to be closed at a normal time, at which the current is not applied.

Braking

Figure 2:
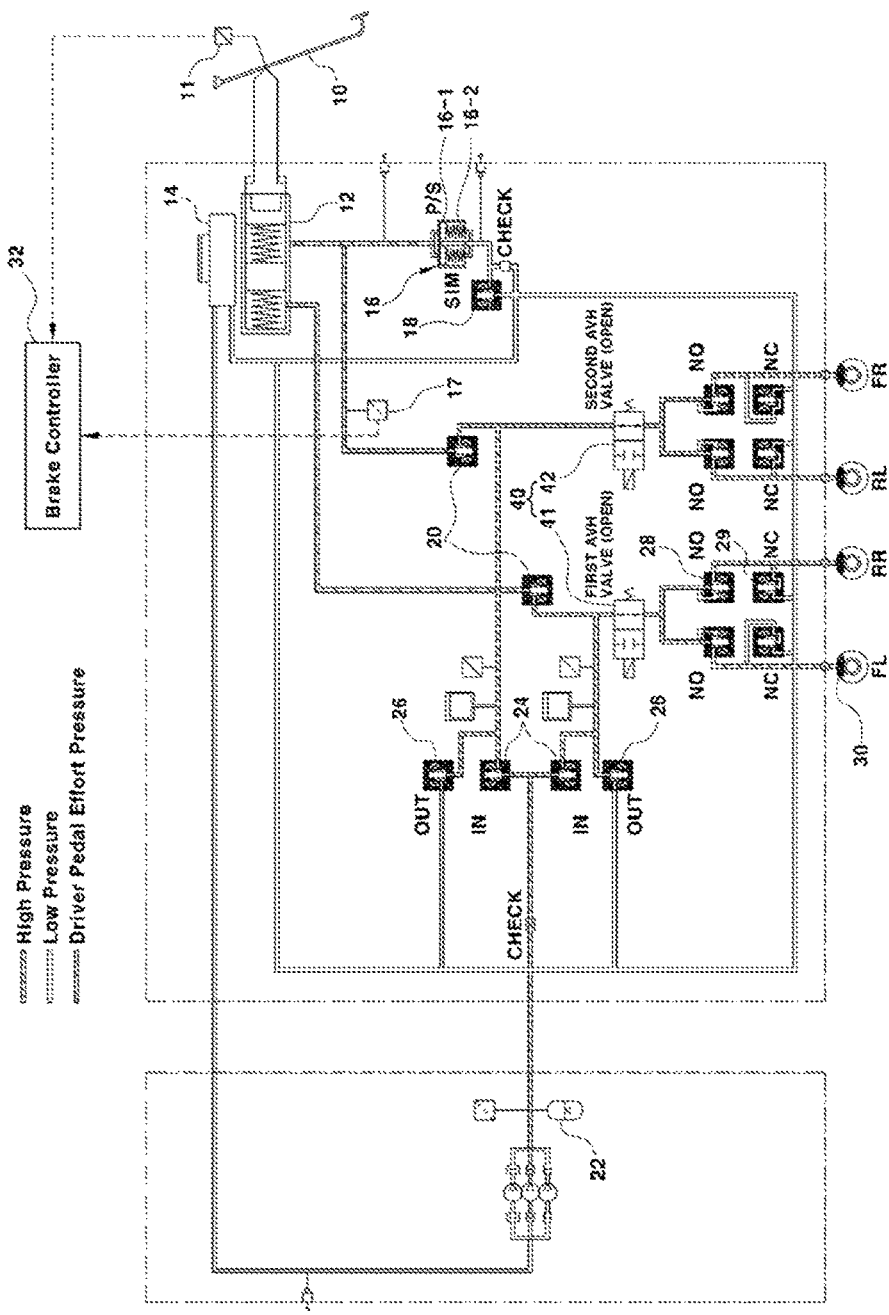
FIG. 2 is a hydraulic brake circuit diagram for an AVH system according to an exemplary embodiment of the present invention, and illustrates an operation state during the braking.
Figure 6:
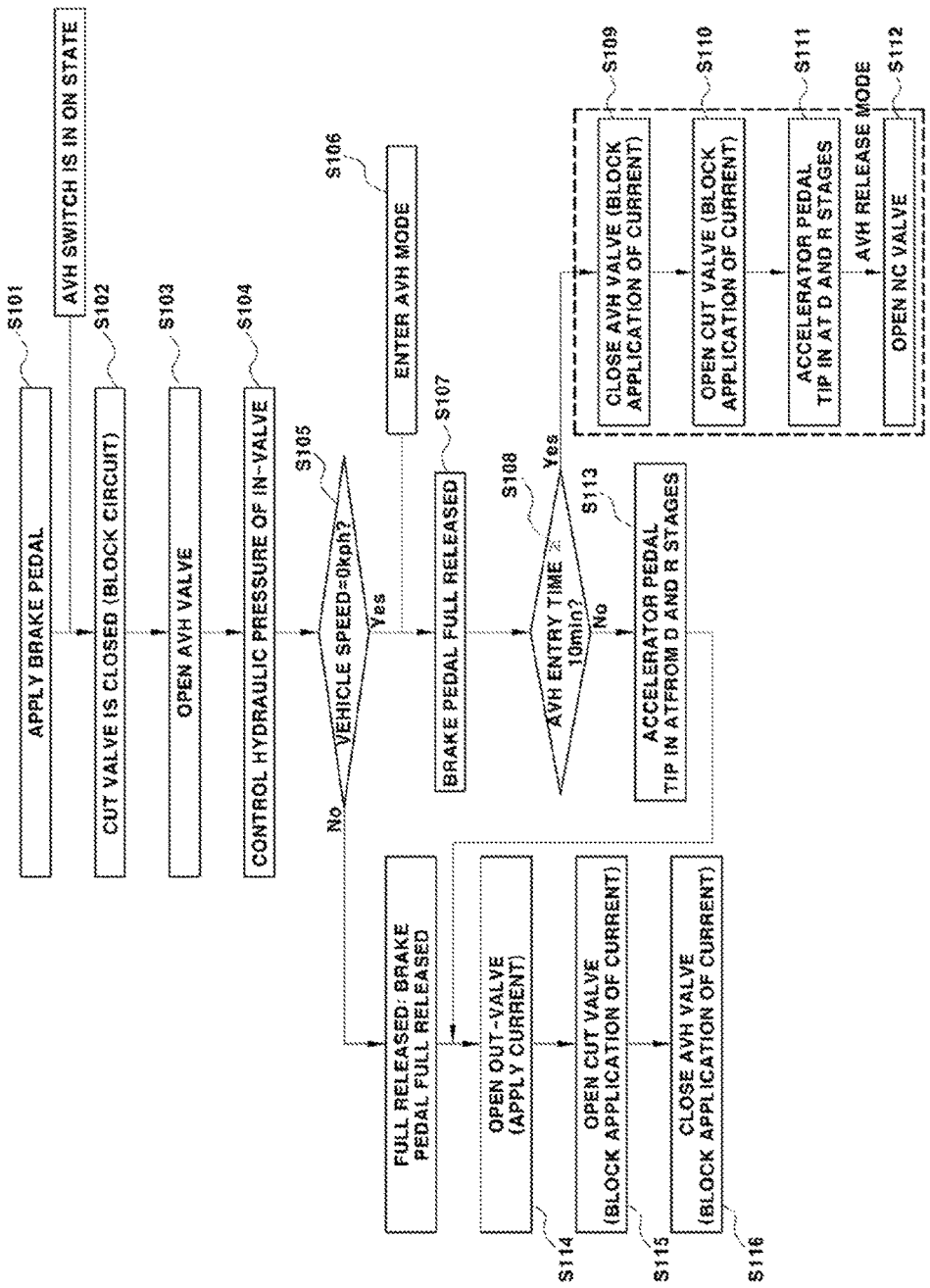
FIG. 6 is a flowchart illustrating an entire operation process of the AVH system according to an exemplary embodiment of the present invention.

FIG. 2 is a hydraulic brake circuit diagram for the AVH system according to an exemplary embodiment of the present invention, and illustrates an operation state during the braking, and FIG. 6 is a flowchart illustrating an entire operation process of the AVH system according to an exemplary embodiment of the present invention.

When a driver steps on the brake pedal while a vehicle is travelling (S101), the cut valve 20 is controlled to be closed by an application of a current under the control of the brake controller 32 (S102), the simulator valve 18 is opened, and the amount of opening of the in-valve 24 is controlled by the control of the current (S104).

The out-valve 26 is maintained in a closed state.

The current is applied to the AVH valve 40, that is, the first AVH valve 41 and the second AVH valve 42, under the control of the brake controller, so that all of the first AVH valve 41 and the second AVH valve 42 are operated in an open state (S103).

Accordingly, the cut-valve 20 is closed, so that the pedal simulator device connected to the master cylinder and the wheel brake hydraulic controller for exerting actual braking force are blocked from each other.

Accordingly, the hydraulic pressure from the high-pressure accumulator 22 passes through the in-valve 24 and the AVH valve 40, and then is provided to the wheel cylinder 30 mounted on each wheel of the vehicle via the normal open valve 28, so that the braking of the vehicle starts, and when a vehicle speed is close to 0 by the continuous braking in an AVH ready situation (S105), the vehicle enters the AVH mode exhibiting the AVH function (S106).

Entering the AVH mode

Figure 3:
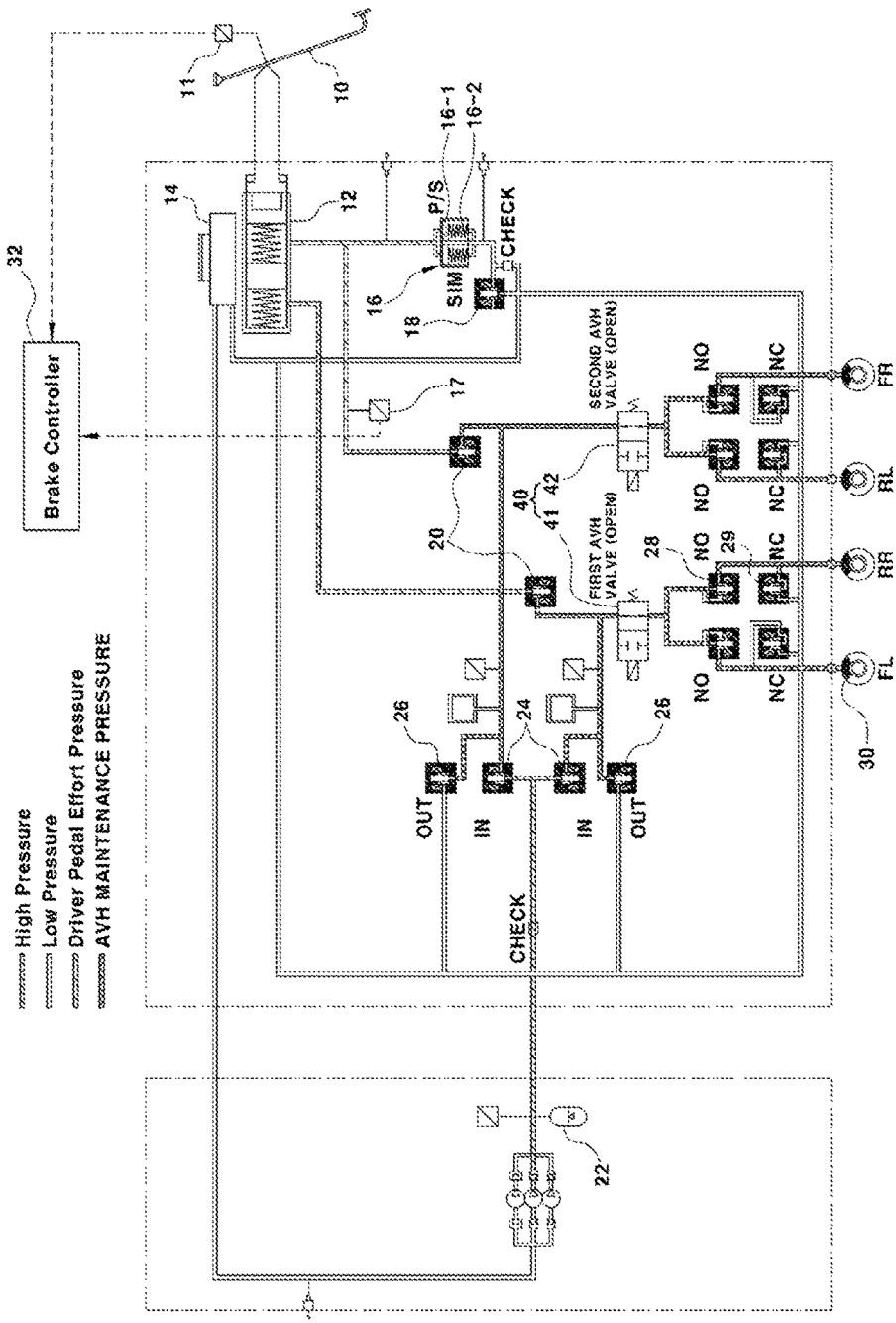
FIG. 3 is a hydraulic brake circuit diagram for the AVH system according to an exemplary embodiment of the present invention, and illustrates an operation state when a vehicle enters an AVH mode.

FIG. 3 is a hydraulic brake circuit diagram for the AVH system according to an exemplary embodiment of the present invention, and illustrates an operation state when the vehicle enters the AVH mode.

After the vehicle enters the AVH mode, the cut valve 20 is continuously maintained in a close state by the application of the current, the in-valve 24 and the out-valve 25 are controlled to be closed, and the first AVH valve 41 and the second AVH valve 42 are continuously maintained in an open state by the application of the current.

Accordingly, the hydraulic pressure provided to the wheel cylinder 30 does not leak, so that the AVH function of maintaining braking force even in a full released state, in which the driver takes his/her foot off the brake pedal, is exhibited (S107).

In the meantime, when a tip-in operation of stepping an accelerator pedal is performed from the D stage or the R stage to start the vehicle in a state where the AVH mode entrance time is a predetermined time (for example, about 10 minutes) or shorter (S113), an AVH braking hydraulic release, in which the hydraulic pressure provided to the wheel cylinder is returned to the hydraulic return line 15 extended from the reservoir via the outlet of the out-valve 26, is performed through operation S114 of controlling the out-valve 26 to be opened, operation S115 of controlling the cut valve 20 to be opened, an operation of maintaining the control of the opening of the AVH valve 40, and the like.

In the instant case, the reason for the control of the cut valve 20 to be opened when the tip-in operation of stepping the accelerator pedal is performed is to initiate the pedal simulator to enable the driver to feel repulse force (pedal operation feeling) later again according to the step on the brake pedal, and the reason for the control of the AVH valve 40 to be opened is to make the hydraulic pressure provided to the wheel cylinder to be discharged to the out-valve 26.

After the control of the cut valve 20 to be opened, the current to the AVH valve 40 is blocked, so that the AVH valve 40 is operated to be closed (S116).

Operation of maintaining the AVH function for a long time

Figure 4:
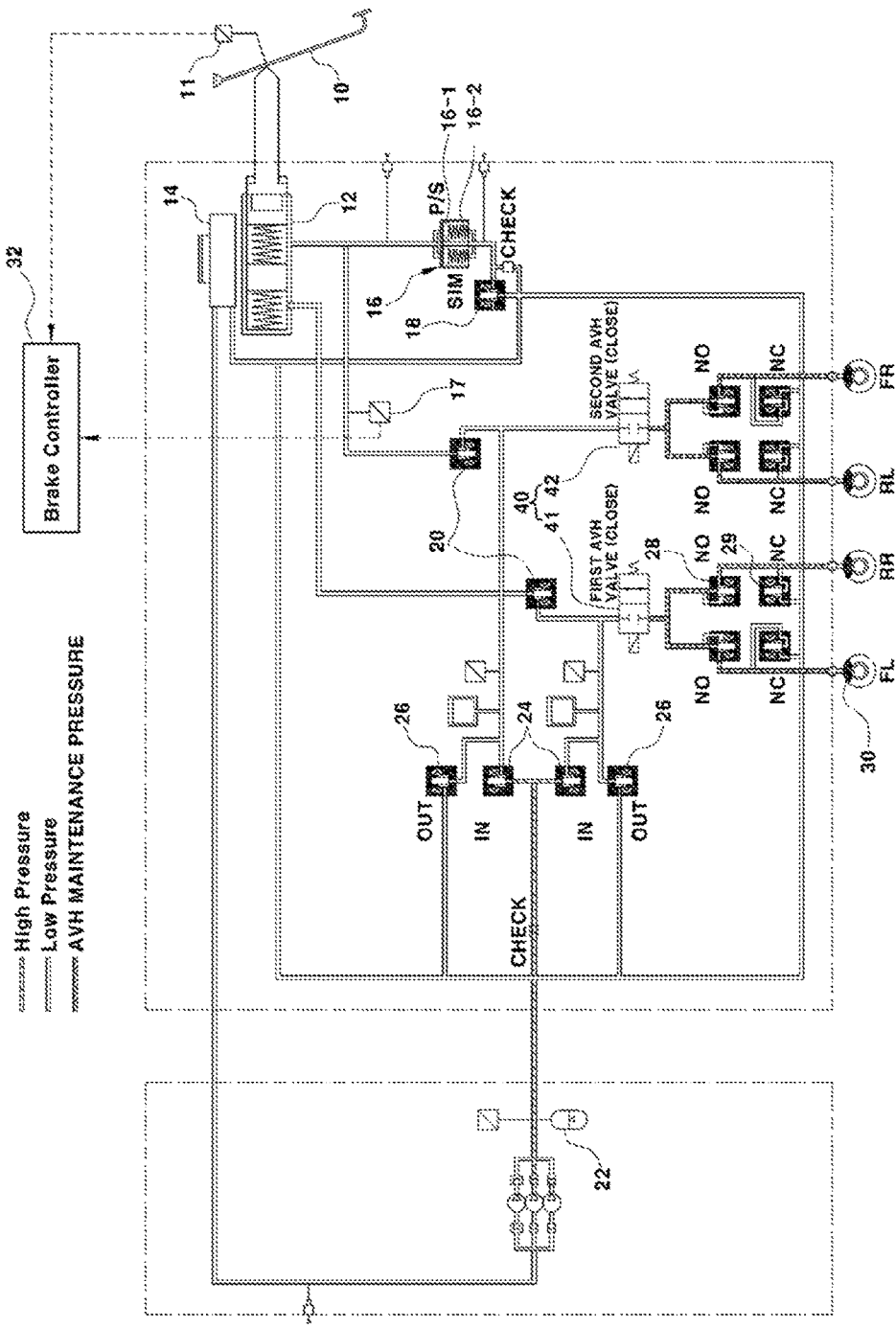
FIG. 4 is a hydraulic brake circuit diagram for the AVH system according to an exemplary embodiment of the present invention, and illustrates a state where the AVH function is maintained for a long time.

FIG. 4 is a hydraulic brake circuit diagram for the AVH system according to an exemplary embodiment of the present invention, and illustrates a state where the AVH function is maintained for a long time.

When the predetermined time (for example, 10 minutes) elapses after the entrance to the AVH mode, that is, the current is continuously applied to the cut valve 20, so that when the cut valve 20 is maintained in the closed state for the predetermined time or longer, heat is generated in the cut valve, and thus, deterioration of the peripheral portion of the cut valve is progressed, and durability of the cut valve is sharply degraded.

Accordingly, it is determined whether the AVH mode entrance time is the predetermined time or longer (for example, 10 minutes) (S108), and when it is determined that the AVH mode entrance time is the predetermined time or longer, the brake controller blocks the current provided to the cut valve 20, so that the cut valve 20 is in the opened state (S110).

To prevent the hydraulic pressure provided to the wheel cylinder from leaking before the cut valve 20 is controlled to be opened, the states of the first AVH valve 41 and the second AVH valve 42 are switched to be the closed state by blocking the current to the first AVH valve 41 and the second AVH valve 42 (S109).

In the instant case, the first AVH valve 41 and the second AVH valve 42 adopt the NC valve type, in which a valve is opened only when a current is applied and the valve is closed in a normal time, in which the current is not applied, so that the states of the first AVH valve 41 and the second AVH valve 42 are switched to the closed state when the current is blocked.

Accordingly, the hydraulic pressure provided to the wheel cylinder 30 does not leak by the closing operation of the first AVH valve 41 and the second AVH valve 42, so that the AVH function, in which braking force is maintained, may be continuously exhibited even in the full released state, in which the drivers takes his/her foot off the brake pedal.

Accordingly, it is possible to block the current to all of the valves including the cut valve and the AVH valve while the AVH function is maintained for a long time, so that it is possible to prevent durability of each valve including the cut valve from deteriorating, improving durability.

Figure 5:
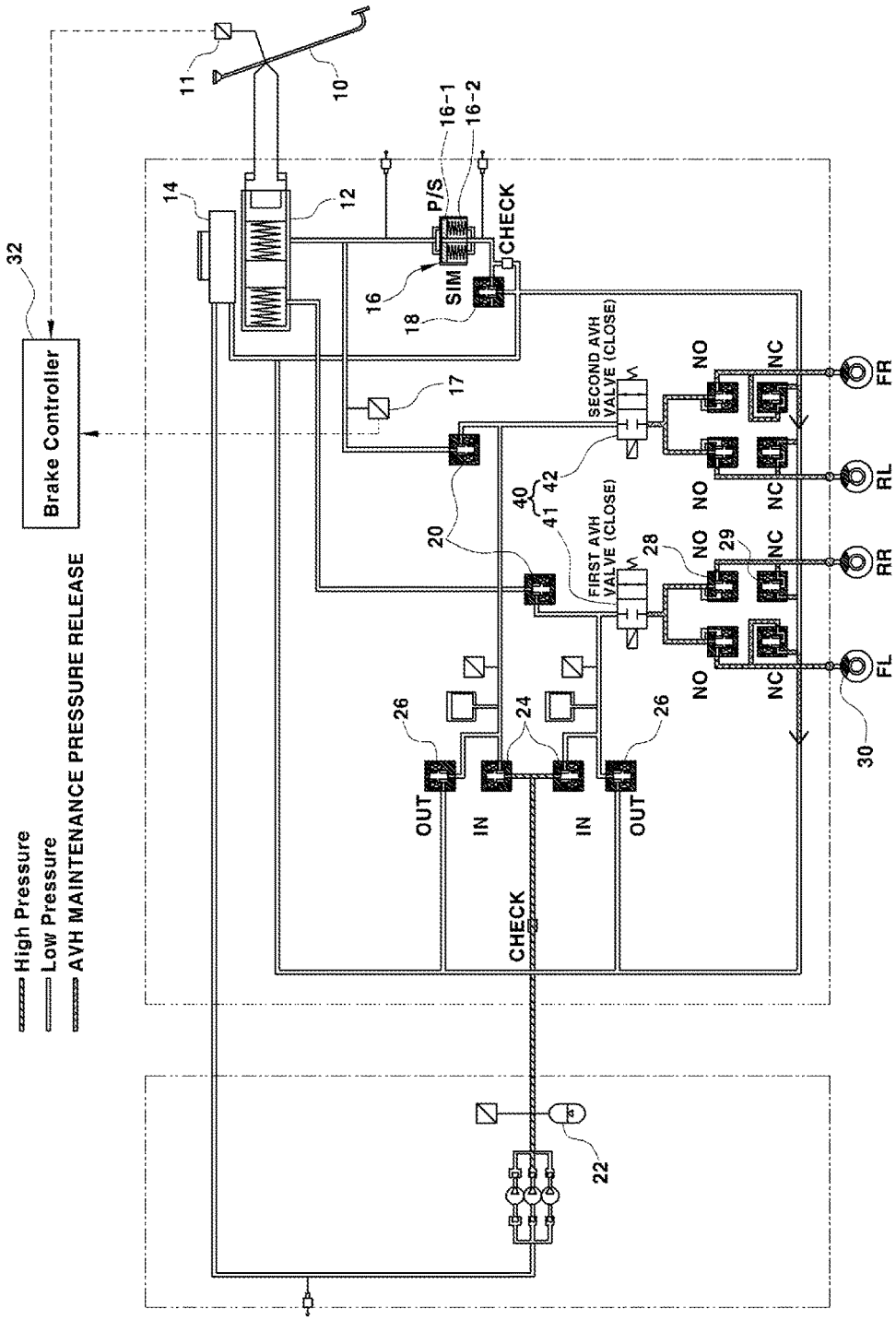
FIG. 5 is a hydraulic brake circuit diagram for the AVH system according to an exemplary embodiment of the present invention, and illustrates an operation state when the AVH function is released.

Release operation of the AVH function after the maintenance of the AVH function for a long time FIG. 5 is a hydraulic brake circuit diagram for the AVH system according to an exemplary embodiment of the present invention, and illustrates an operation state when the AVH function is released after the AVH function is maintained for a long time.

When the tip-in operation, in which the driver steps on the accelerator pedal from the D stage or the R stage to start the vehicle, is performed in the state where the AVH function is maintained for a long time (S111), the release of the AVH braking hydraulic pressure is performed.

To this end, the brake controller controls the current to be temporarily applied to the normal close valve 29, so that the normal close valve 29 is temporarily opened (S112).

In the instant case, the current is applied to the normal close valve 29 for a momentary time of the millisecond unit.

Accordingly, the normal close valve 29 is connected to the branched line 34 branched from the line connected from the normal open valve 28 to the wheel cylinder 30, and the outlet of the normal close valve 29 is connected to the hydraulic return line 15 extended from the reservoir, so that the hydraulic pressure provided to the wheel cylinder 30 is returned to the hydraulic return line 15 through the outlet of the normal close valve 29, which is temporarily in the open state, so that the AVH braking hydraulic pressure is easily released.

As described above, only the pair of AVH valves for implementing the AVH function are simply and additionally formed in the brake hydraulic circuit of the AHB, so that it is possible to allow the AVH function to be maintained for a long time even in the state where the EPB is not mounted.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A system for controlling an auto vehicle hold (AVH) for a vehicle, the system comprising:
   valves mounted in a brake hydraulic circuit, the valves including a cut valve, which blocks a hydraulic pressure flowing from a master cylinder to a wheel cylinder during an operation of the AVH, an in-valve and an out-valve, which are connected to an outlet of a high-pressure accumulator adjusting a hydraulic pressure within a reservoir at a high pressure, a normal open valve, which is mounted in a brake hydraulic line extended from an outlet of the in-valve and an outlet of the cut-valve to the wheel cylinder, and a normal close valve, which is mounted on a branched line branched from the brake hydraulic line extended from the normal open valve to the wheel cylinder and includes an outlet connected to a hydraulic return line,
   wherein an AVH valve for securing a long-term maintenance of an AVH function is mounted in the brake hydraulic line between the outlet of the in-valve and the outlet of the cut valve, and an inlet of the normal open valve.

2. The system of claim 1, wherein the AVH valve includes a first AVH valve for controlling hydraulic pressure of front-left and rear-right wheels, and a second AVH valve for controlling hydraulic pressure of front-right and rear-left wheels.

3. The system of claim 1, wherein the AVH valve adopts a normal close (NC) valve type, in which a valve is configured to be opened when a current is applied, and a valve is configured to be closed at a normal time, at which a current is not applied.

4. The system of claim 1, wherein during braking, the cut valve is configured to be controlled to be closed by an application of a current, an amount of opening of the in-valve is configured to be controlled by a control of the current, the out-valve is maintained in a closed state, and the AVH valve is configured to be operated in an opened state by the application of the current.

5. The system of claim 4, wherein the hydraulic pressure from the high-pressure accumulator passes through the in-valve and the AVH valve and is provided to the wheel cylinder via the normal open valve, wherein the braking of the vehicle is performed, and when a vehicle speed is close to 0, the vehicle enters the AVH mode.

6. The system of claim 1, wherein after the vehicle enters the AVH mode, the cut valve is configured to be controlled to be continuously closed by the application of the current, the in-valve and the out-valve are configured to be controlled to be closed, and the AVH valve is continuously maintained in the open state by the application of the current, wherein the AVH function, in which braking force in a full released state is maintained, is exhibited.

7. The system of claim 6, wherein when a tip-in operation of stepping on an accelerator pedal in a state where an entrance time is a predetermined time or shorter after the vehicle enters the AVH mode is performed, an AVH braking hydraulic pressure release, in which the hydraulic pressure, which has been provided to the wheel cylinder, is returned to a hydraulic pressure return line via the outlet of the out valve, is performed through an operation of controlling the out-valve to be opened, the operation of controlling the cut valve to be opened by the blocking of the current, and the operation of maintaining the control of the AVH valve to be opened.

8. The system of claim 7, wherein after the control of the cut valve to be opened, the AVH valve is configured to be operated to be closed by the blocking of the current.

9. The system of claim 6, wherein when an entrance time is a predetermined time or longer after the vehicle enters the AVH mode, the state of the AVH valve is switched to the closed state by blocking the current to the AVH valve, and then, the cut valve is configured to be operated to be opened by the blocking of the current.

10. The system of claim 9, wherein according to the switching of the state of the AVH valve to the closed state, the hydraulic pressure provided to the wheel cylinder is maintained, wherein the AVH function, in which braking force is maintained in a full released state, is continuously exhibited.

11. The system of claim 6, wherein when the tip-in operation of stepping on the accelerator pedal in a state where an entrance time is a predetermined time or longer after the vehicle enters the AVH mode is performed, the normal close valve is configured to be operated to be opened by an application of the current, wherein the AVH braking hydraulic pressure release is performed.

12. The system of claim 11, wherein according to the operation of the normal close valve to be opened, the hydraulic pressure, which has been provided to the wheel cylinder, is returned to the hydraulic pressure return line connected to an outlet of the normal close valve, wherein the AVH braking hydraulic pressure release is performed.

13. The system of claim 11, wherein the application of the current to the normal close valve is performed for a time in a millisecond unit.

* * * * *